(12) United States Patent
Liu et al.

(10) Patent No.: US 12,710,343 B2
(45) **Date of Patent: *Aug. 18, 2026**

(54) PATHOGENIC MICROORGANISM RAPID CONCENTRATION DEVICE AND METHOD

(71) Applicant: NANJING ORIGINALCODE PARTNERSHIP (LIMITED PARTNERSHIP), Nanjing (CN)

(72) Inventors: Quanjun Liu, Nanjing (CN); Xiaoxiang Zhou, Nanjing (CN); Zhanping Li, Nanjing (CN); Zhen Zhang, Nanjing (CN); Yan Huang, Nanjing (CN)

(73) Assignee: NANJING ORIGINALCODE PARTNERSHIP (LIMITED PARTNERSHIP), Nanjing (CN)

(*) Notice: Subject to any disclaimer, the term of this patent is extended or adjusted under 35 U.S.C. 154(b) by 730 days.

This patent is subject to a terminal disclaimer.

(21) Appl. No.: 18/016,126

(22) PCT Filed: Aug. 6, 2021

(86) PCT No.: PCT/CN2021/111095

§ 371 (c)(1),
(2) Date: Jan. 13, 2023

(87) PCT Pub. No.: WO2022/033395

PCT Pub. Date: Feb. 17, 2022

(65) Prior Publication Data

US 2023/0273102 A1 Aug. 31, 2023

(30) Foreign Application Priority Data

Aug. 14, 2020 (CN) ........................ 202010821391.9

(51) Int. Cl.
*G01N 1/40* (2006.01)

(52) U.S. Cl.
CPC ....... *G01N 1/40* (2013.01); *G01N 2001/4038* (2013.01)

(58) Field of Classification Search
CPC ............ G01N 1/40; G01N 2001/4038; G01N 2001/4088; Y02A 50/30
See application file for complete search history.

(56) References Cited

U.S. PATENT DOCUMENTS

2010/0193358 A1 8/2010 Hamada
2013/0327647 A1* 12/2013 Ohira .............. G01N 27/44756 204/627

(Continued)

FOREIGN PATENT DOCUMENTS

CN 1141078 A 1/1997
CN 1445541 A 10/2003

(Continued)

OTHER PUBLICATIONS

CN 111013674 Translation (Year: 2020).*

*Primary Examiner* — Samuel P Siefke
(74) *Attorney, Agent, or Firm* — MUNCY, GEISSLER, OLDS & LOWE, P.C.

(57) ABSTRACT

The present invention discloses a pathogenic microorganisms rapid concentration device and method. The device comprises an electrode and a microchannel for passing a sample, wherein the microchannel comprises a concentration channel and a sample channel, between which a filter element is provided, the electrode comprises a positive electrode and a negative electrode, the positive electrode comprises several sub-positive electrodes, after the sample flows into the microchannel, under the action of the electrode, pathogenic microorganisms in the sample are regionally enriched on a positive electrode side of the concentration channel to form a concentrated sample. The present invention provides a substantial increase in the rate and (Continued)

efficiency of purification of samples containing pathogenic microorganisms through precise electrical control. The concentration of pathogenic microorganisms can be achieved accurately and efficiently by controlling the voltage applied by the sub-positive electrode, which provides a good basis for the integration, automation, rapid and continuous sampling, and detection.

9 Claims, 7 Drawing Sheets

(56) References Cited

U.S. PATENT DOCUMENTS

2018/0099278 A1* 4/2018 Niemeyer ............. F04B 19/006
2023/0287522 A1* 9/2023 Liu .......................... G01N 1/40

FOREIGN PATENT DOCUMENTS

| | | | |
|---|---|---|---|
| CN | 101036213 | A | 9/2007 |
| CN | 102099666 | A | 6/2011 |
| CN | 102749321 | A | 10/2012 |
| CN | 103857784 | A | 6/2014 |
| CN | 105051214 | A | 11/2015 |
| CN | 107615041 | A | 1/2018 |
| CN | 108072594 | A | 5/2018 |
| CN | 111013674 | * | 4/2020 |
| CN | 111912697 | A | 11/2020 |
| CN | 112226360 | A | 1/2021 |
| JP | 2007053917 | A | 3/2007 |
| JP | 2012068192 | A | 4/2012 |
| JP | 2019178985 | A | 10/2019 |
| WO | 1999062622 | A1 | 12/1999 |
| WO | 2001083113 | A1 | 11/2001 |
| WO | WO2009/042921 | * | 4/2009 |
| WO | 2019014692 | A1 | 1/2019 |

* cited by examiner

PATHOGENIC MICROORGANISM RAPID CONCENTRATION DEVICE AND METHOD

TECHNICAL FIELD

The present invention belongs to the technical field of pathogenic microorganism detection, in particular to a device and method capable of rapidly and efficiently concentrating pathogenic microorganisms.

BACKGROUND ART

Respiratory infectious diseases often outbreak, in the past decade, there have been Corona Virus Disease 2019, SARS, Middle East respiratory syndrome, avian, etc. Without effective control, infectious diseases will cause a virus pandemic, which poses a great threat to human health and social economy. The major solution for prevention and control of infectious diseases can be that the preventive measures of infectious diseases can be divided into three aspects: controlling the source of infection, cutting off the route of transmission and protecting susceptible population. One of the most important is the identification of the source of infection. Especially in highly populated areas such as subways, railway stations and airports, the possibility of outbreaks of infectious diseases can be reduced very effectively if the source of infection can be detected and isolated in a timely manner. Therefore, it would be desirable to develop a simple and rapid detection device that collects exhaled gases and detects whether they carry pathogens. Pathogens refer to microorganisms, parasites or other agents that can cause disease in humans or animals or plants. Thus, there is a need to detect pathogens in gases.

The detection of virus in gas includes sampling and detection. There are four main methods for collecting microorganisms in gas, which are gravity sampling, inertial impaction, filtration retention and electrostatic deposition. The main idea is to use an air sampler to transfer microorganisms in the air to a certain medium, which may be liquid, solid or semi-solid. Since fewer viruses are collected, it is necessary to culture the viruses first and then detect them by sequencing, chemiluminescence or optical means.

According to gravity sampling method, under the action of the gravity of microbial aerosol, microbial particles are collected in the culture dish within a certain period of time, and then cultured and grown into colonies at appropriate temperature for biological observation and study. The inertial sampling method is to use an air extraction pump to extract air containing microbial particles, and force the air to pass through a nozzle on a sampler to form a high-speed jet air stream; when leaving the nozzle, the jet air stream is forced to deflect, and particles with a particle size greater than or equal to the cutting particle size D50 (the aerodynamic diameter of particles when the collection efficiency is 50%, μm) are collected on the sampling medium due to the inertial effect; particles smaller than D50 escape with the deflection of the airflow due to the small inertia. An electrostatic sampler operates when charged particles enter an electric field, deflected by the force of the electric field, and therefore are collected on a polar plate.

However, these methods have certain drawbacks. The gravity sampling method has very low sampling efficiency for small particle size and small number of pathogens in the air, and is greatly affected by the airflow. The inertial sampling method is also not good for collecting germ particles with small particle size, and it is easy to damage microorganisms due to air jet during sampling operation. The filter-type sampler can reside germ particles on the filter material to collect the particles, however, if the sampling is continued for a long time, the microorganisms on the filter membrane are dehydrated to lose their activity. The electrostatic sampler has simple structure, small pressure drop, a large amount of air that can be collected, a high concentration ratio, a high efficiency of trapping fine particles, and can better maintain microbial morphology and biological activity. However, long sampling times, evaporation of media such as agar, droplets, etc. can cause changes in humidity within the sampler to affect collection efficiency.

The virus can only propagate in host cells. Infected cells can spread the virus directly to the surrounding air (primary aerosolization) or to fluids and surfaces, thereby becoming a source of airborne (secondary aerosolization). Secondary aerosolization of any virus can occur, mainly when the air is flowing against contaminated surfaces or fluids, wherein the virus will disperse into the air. In fact, any infected organism or material, even the breakdown of air bubbles in seawater, can produce virus-carrying particles in the air.

The most important aerosol source is human body itself, and aerosol-mediated human infection can occur in daily life. For example, simply flushing a close stool containing infectious particles can achieve significant levels of viral concentration in the air. Sewage treatment plants and sewage sprinklers can also produce viral aerosols. Farm animals have also been investigated for airborne transmission of viruses. Foot and mouth disease virus is one of the most widely studied airborne animal viruses that can be detected in the air contaminated by infected pigs and ruminants. This single-stranded RNA virus is a small RNA virus and can be excreted in all body fluids of infected animals[7]. Therefore, the detection of airborne pathogens is necessary.

The virus concentration methods used so far mainly rely on the following methods.

1. Filtration of negatively charged capsid viruses present in water through negative charge filters requires prior acidification or salinization of the water. This method is difficult to deal with turbid samples and large-volume samples, and needs the recovery process to adjust many conditions.
2. Use of electropositive filters that do not require sample pretreatment. This method is also difficult to process turbid samples and large-volume samples, and involves expensive device consumables.

For both types of filtration, the recovery of virus particles is mainly affected by the elution step required to recover the retained virus from the filter rather than the filtration itself.

3. Ultrafiltration is a filtration based on the size of the virus and is difficult to use for virus concentration on high turbidity samples.
4. The virus is flocculated/precipitated using organic/inorganic flocculants for subsequent settling. However, this method cannot concentrate large volume samples, and the samples need to be pretreated.
5. Ultra-centrifugation and centrifugal ultrafiltration which rely mainly on virus size for concentration, are suitable only for small volume samples and require expensive centrifugation device.

Electronegative, electropositive filtration and ultrafiltration are the primary concentration methods, whereas ultra-centrifugation, ultrafiltration and flocculation precipitation are the secondary concentration methods. Positive filtration is a method of concentration in one or two steps.

The researchers analyzed the available performance data for the different methods and the results showed that there is no statistical difference when applying different methods, different types of samples or different test volumes. Recovery rate of poliovirus is high in almost all evaluation methods, while recovery rate of adenovirus or rotavirus is low, and no information is provided on epidemic virus (such as human polyoma virus or papilloma virus) or plant virus (such as pepper mild mottle virus). There is a need for a rapid concentration method of viruses in large volumes of samples.

If real-time detection is to be achieved, the strategy of post-sampling culture cannot be adopted, so the concentration of pathogens in the sampled samples is required to be high. However, in the early stages of infectious diseases, the concentration of pathogens in the exhaled gas of patients is limited, and if these potential sources of infection are to be detected in a timely manner, it is necessary to increase the concentration of pathogens in the sample, mainly to enrich the pathogens in the exhaled gas. The enriched sample can be directly connected to the downstream detection device to realize real-time monitoring. The number and quality of pathogens in the samples obtained by the existing pathogen enrichment strategies are insufficient to support the development of downstream detection devices.

SUMMARY OF THE INVENTION

It is an object of the present invention to provide a pathogenic microorganisms rapid concentration device and method, which enables convenient and efficient concentration of pathogenic microorganism particles in a fluid.

In order to solve the above technical problem, the present invention provides the following technical solutions:

The present invention firstly provides a pathogenic microorganisms rapid concentration device, which comprises an electrode and a microchannel for passing a sample, the microchannel comprises a concentration channel and a sample channel, between which a filter element is provided, the electrode comprises a positive electrode and a negative electrode, the positive electrode comprises a plurality of sub-positive electrodes, the plurality of sub-positive electrodes is provided in a spaced array on a side close to the concentration channel, the negative electrode is provided on a side close to the sample channel, a fluctuating voltage greater than zero is applied to a single sub-positive electrode during concentration, the voltage of the sub-positive electrodes adjacent thereto alternates with the fluctuating voltage to form a varying potential difference between the adjacent sub-positive electrodes; after the sample flows into the microchannel, pathogenic microorganisms in the sample are regionally enriched on the positive electrode side of the concentration channel under the action of the electrode to form a concentrated sample.

Further, the outlet and the inlet of the microchannel are provided with a pair of driving electrodes.

Further, the fluctuation form of fluctuation voltage greater than zero comprises rectangular wave, and/or triangular wave, and/or sine wave, or the superposition wave of the first three waves.

Still further, the filter element is a semi-permeable membrane, and/or an array of micro-columns, and/or a gel polymer, and is a filter structure with voids.

Still further, the concentration channel has a width of less than that of the sample channel.

Further, the width $L_1$ of the sample channel and the width $L_2$ of the concentration channel satisfy:

$$L_1V_1/L_2V_2 \geq X$$

wherein $V_1$ is a flow rate of the sample channel, $V_2$ is a flow rate of the concentration channel, and X is a ratio of the concentration of the concentrated sample to the concentration of the sample before concentration.

Further, the microchannel is made of polymethyl methacrylate (PMMA), polyethylene (Tygon), poly (ethylene-co-propylene) (FEP) or poly (tetrafluoroethylene) (PTFE), COC/COP cyclic olefin copolymer, polycarbonate (PC).

The present invention also provides a pathogenic microorganisms rapid concentration method comprising:

- making the sample enter the microchannel, under the action of the positive electrode and the negative electrode, gradually biasing the pathogenic microorganisms to one side of the positive electrode, and making the pathogenic microorganisms enter the concentration channel via the filter element;
- applying a fluctuating voltage greater than zero on a single sub-positive electrode, wherein the voltage of the sub-positive electrode adjacent thereto alternates with the fluctuating voltage and forms a varying potential difference between the adjacent sub-positive electrodes, and pathogenic microorganisms reciprocate between the two adjacent sub-positive electrodes and gradually enrich in the middle region of the two adjacent sub-positive electrodes; and
- obtaining a concentrated sample at the outlet of the concentration channel.

Further, several sub-positive electrodes are provided, wherein some or all the single sub-positive electrodes are applied with a fluctuating voltage, and a fluctuating electric field is formed among a number of sub-positive electrodes therein, forming one or more enrichment regions, and the number of electrodes supplying voltage during enrichment can also be gradually reduced to form fewer enrichment regions for further enrichment.

Advantageous effects of the present invention are:

- the present invention provides a substantial increase in the rate and efficiency of purification of samples containing pathogenic microorganisms through precise electrical control. The present invention deflects particles of pathogenic microorganisms with little voltage, according to the COMSOL simulation results, the deflection rate can reach 100%, and the theoretical recovery rate of pathogenic microorganisms is very high. The concentration of pathogenic microorganisms can be achieved accurately and efficiently by controlling the voltage applied by the electrode, which provides a good basis for the integration, automation, rapid and continuous sampling and detection. The present invention greatly reduces detection errors due to complex adsorption and elution steps.

Figure 1:
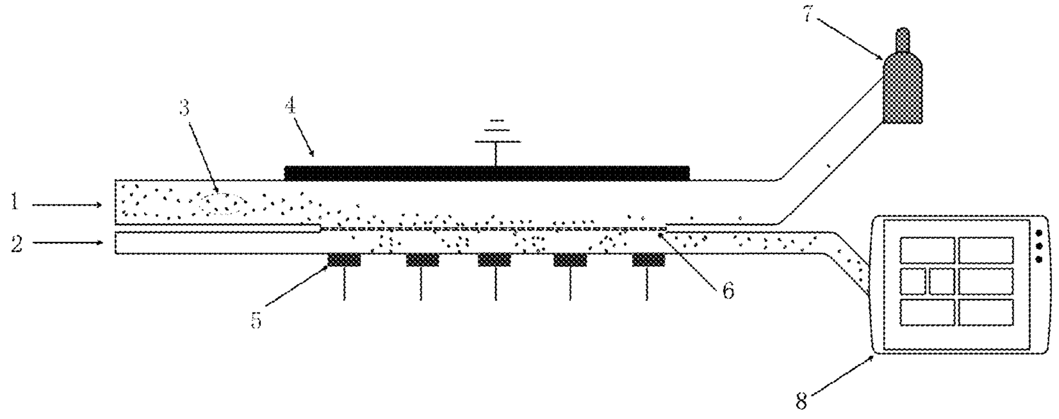
FIG. 1 is a schematic structural diagram of a device of an embodiment.

Reference numerals: 1, sample channel, 2, concentration channel, 3, pathogenic microorganism, 4, negative electrode, 5, positive electrode, 6, filter element, 7, waste liquid sample pool, 8, detection unit.

DETAILED DESCRIPTION OF THE INVENTION

Reference will now be made in detail to the embodiments of the present invention, examples of which are illustrated in the accompanying drawings, wherein like reference numerals refer to the same or similar elements throughout the several views, and wherein like reference numerals refer to the same or similar elements throughout the several views. The embodiments described below with reference to the figures are exemplary and are intended to be illustrative of the invention and are not to be construed as limiting the invention.

In the description of the present embodiments, it should be noted that the terms “central”, “upper”, “lower”, “left”, “right”, “vertical”, “horizontal”, “inner”, “outer”, and the like designate orientations or positional relationships based on the orientation or positional relationships shown in the drawings, are merely for convenience in describing the invention and to simplify the description, and do not indicate or imply that the referenced devices or elements must have a particular orientation, be constructed and operated in a particular orientation, and thus should not be construed as limiting the invention. Further, the terms “first”, “second”, and “third” are used for descriptive purposes only and are not to be construed as indicating or implying relative importance or implicitly indicating the number of technical features indicated.

Figure 2:
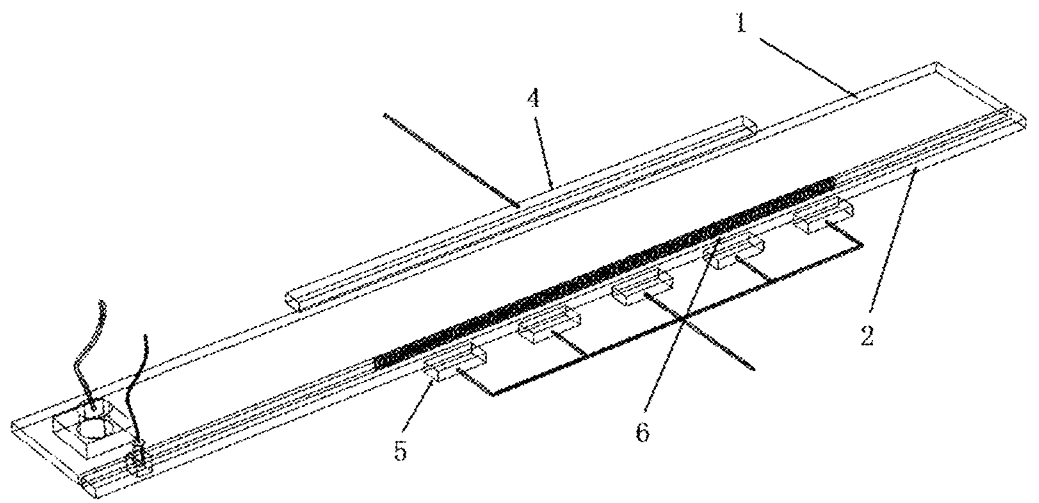
FIG. 2 is a schematic perspective view of a device of an embodiment.
Figure 5:
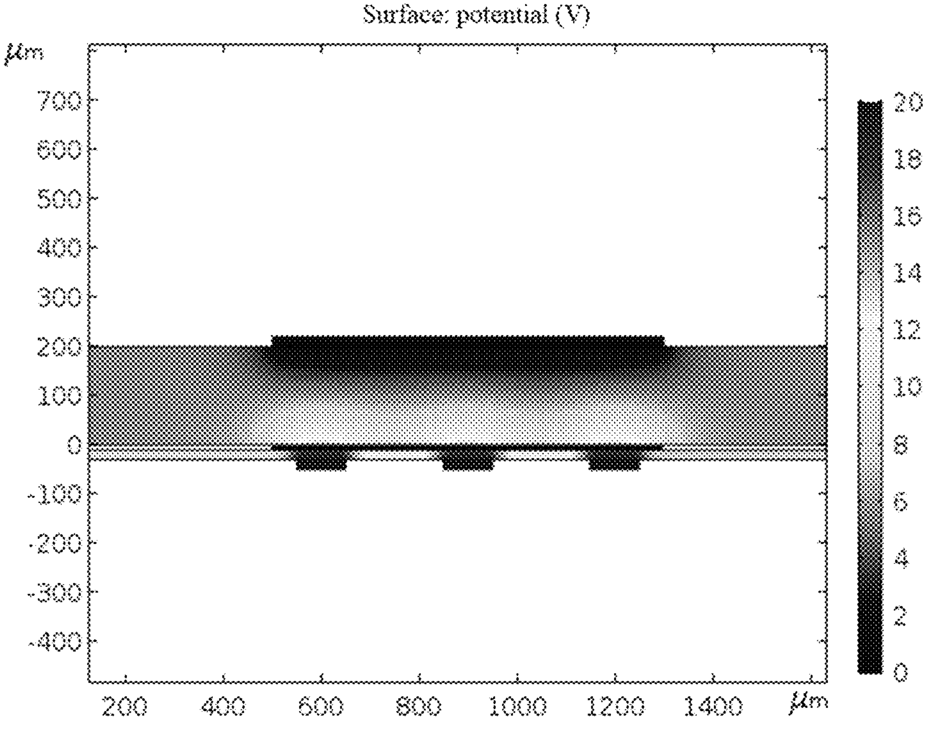
FIG. 5 is a schematic diagram of potential distribution simulation.

This example provides a pathogenic microorganisms rapid concentration device as shown in FIGS. 1-2. The pathogenic microorganisms 3 rapid concentration device (in this embodiment, pathogenic microorganisms include bacteria, viruses, mycoplasma, chlamydia, etc.) comprises a microchannel for passing a sample, and the microchannel comprises a concentration channel 2 and a sample channel 1. Provided between the concentration channel and the sample channel is a filter element 6 (which may be a semi-permeable membrane, and/or an array of micro columns, and/or a gel polymer, and/or a filter element of other filter structures with voids). The electrode comprises a positive electrode 5 and a negative electrode 4 (the negative electrode can be grounded), the positive electrode comprises several sub-positive electrodes (for example, five sub-positive electrodes are provided in FIGS. 1 and 2), several sub-positive electrodes are provided in a spaced array on one side close to the concentration channel 2, and the negative electrode is provided on one side close to the sample channel 1; during the concentration, a fluctuating voltage greater than zero is applied to a single sub-positive electrode, and the voltage of a sub-positive electrode adjacent thereto alternates with the fluctuating voltage, so that a varying potential difference is formed between adjacent sub-positive electrodes. It should be noted that reference herein to “adjacent” does not refer to physical proximity, but rather refers to the two most adjacent sub-positive electrodes having an alternating voltage relationship, e.g., when one or more of the sub-positive electrodes is grounded, the two adjacent sub-positive electrodes may span one or more of the sub-positive electrodes. After the sample flows into the microchannel, pathogenic microorganisms 3 in the sample are regionally enriched on the positive electrode side of the concentration channel 2 to form a concentrated sample under the action of the electrode (the potential distribution is shown in FIG. 5). The concentrated sample may be connected to the detection unit 8 of the detection system as shown in FIG. 1, and the waste liquid sample may be collected into the waste liquid sample pool 7 as shown in FIG. 1 for harmless treatment. The rapid concentration device of pathogenic microorganisms can achieve rapid and accurate concentration of low-concentration pathogenic samples and provide a good basis for real-time detection.

Figures 9, 10:
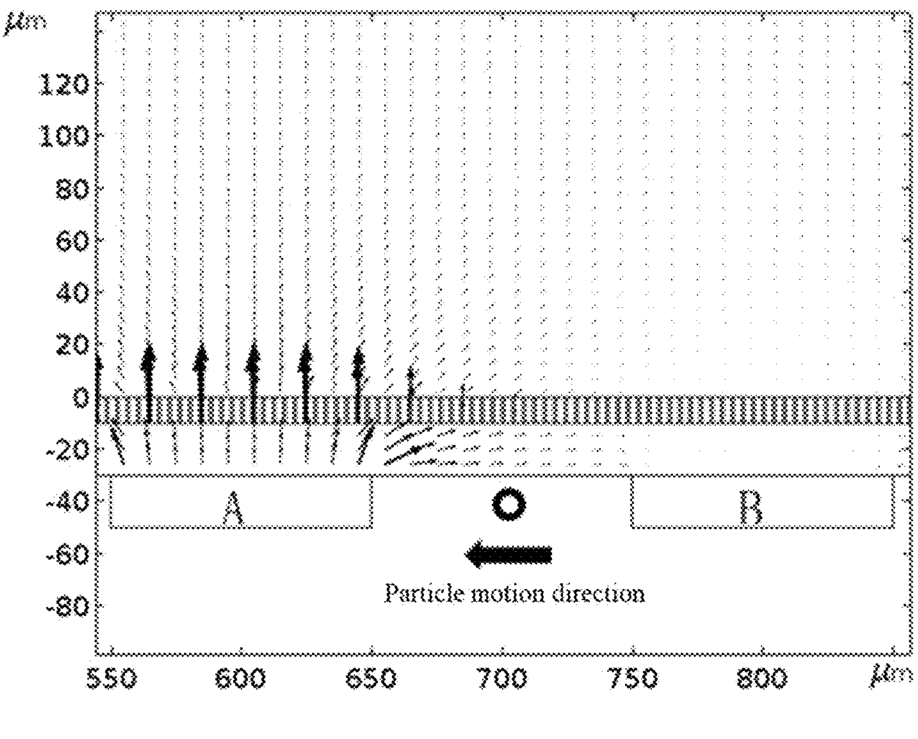
FIG. 9 is a graph of the electric field distribution at time t1 in FIG. 8.
FIG. 10 is a graph of the electric field distribution at time t2 in FIG. 8.

The undulating form of the fluctuating voltage greater than zero in the present invention includes a rectangular wave, and/or a triangular wave, and/or a sine wave, etc. and in this embodiment, the fluctuating voltage is preferably a rectangular fluctuating voltage as shown in FIG. 9. There are four main forces on pathogenic microorganism particles in the flow channel, one is drag force provided by fluid flow, the other is electrostatic force driven by electric field, the third is Brown force provided by thermal motion, and the fourth is dielectrophoretic force generated by polarization of pathogenic microorganism particles caused by non-uniform electric field. When the above-mentioned alternating voltage is a rectangular wave-like alternating voltage, the pathogenic microorganism particles will be mainly subjected to electrostatic force and drag force. The square voltage is characterized by low frequency and transient voltage change, and therefore the electric field in the sample flow channel and the purification flow channel is substantially a uniform electric field, while the transient change will not cause uneven change of the electric field, so that the pathogenic microorganism particles are subjected to dielectrophoretic force substantially negligible.

In this embodiment, to further control the flow of sample in the microchannel, a pair of driving electrodes may be provided at the outlet and the inlet of the microchannel. For example, a driving negative electrode is provided at the inlet of the microchannel, and a driving positive electrode is provided at the outlet of the microchannel, so that the sample is subjected to the dual action of the flow field and the electric field in the sample channel 1, and the flow field and the electric field together provide the motive force for the pathogenic microorganism particles to flow forward; as another example, a positive drive electrode can be provided at the inlet of the microchannel and a negative drive electrode can be provided at the outlet of the microchannel so that the time of the concentration process can be extended by reducing the rate at which the sample flows in the microchannel.

In this embodiment, the semi-permeable membrane is preferably a membrane with nano voids mixed with cellulose ester materials, and the material thereof is preferably a PTFE PTFE, ePTFE, alumina membrane or polypropylene filter membrane; the material of the microchannel is preferably polymethyl methacrylate (PMMA), polyethylene (Tygon), poly (perfluoroethylene-propylene) copolymer (FbP) or poly (tetrafluoroethylene) (PTFE), COC/COP cyclic olefin copolymer, and polycarbonate (PC).

In the present embodiment, the width of the concentration channel 2 is preferably less than the width of the sample channel 1; when the concentration of the concentrated sample is more than X times the concentration of the sample before concentration (hereinafter, taking 100 times as an example), assuming that the width $L_1$ of the sample channel 1, the width $L_2$ of the concentration channel 2, the heights of the two flow channels are H, the flow rate $V_1$ of the sample channel 1, the flow rate $V_2$ of the concentration channel 2, and M samples existing in the sample channel 1 need to be concentrated to the concentration channel 2 within T time, then:

Flow: Q=LHVT;

Content: W=M/Q;

in order that the concentration after concentration is at least 100 times the concentration before concentration, then $W_2 > 100\ W_1$;

then: $M/L_2H_2V_2T \geq 100M$/then:

$L_1V_1/L_2V_2 \geq 100$.

Figure 3:
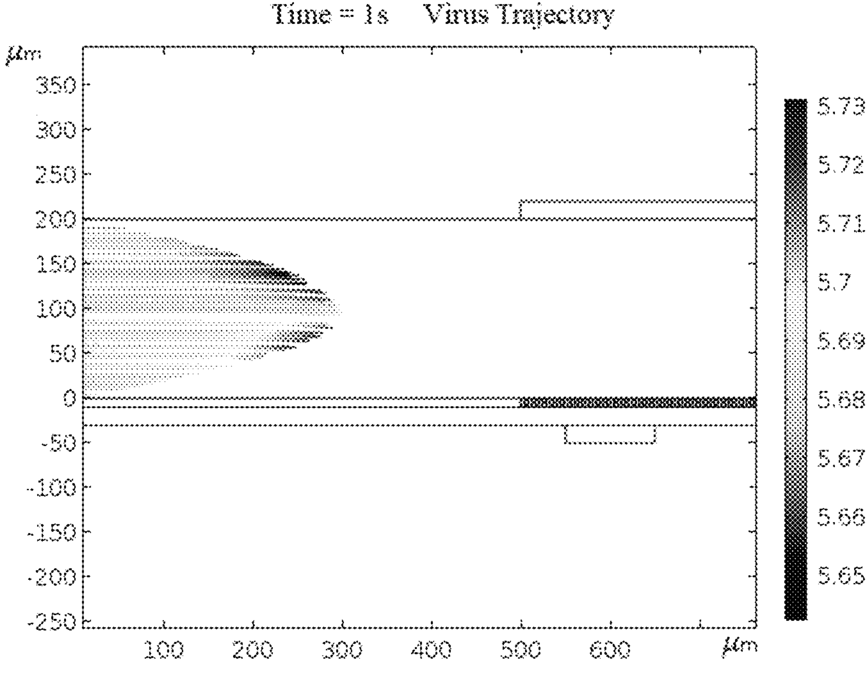
FIG. 3 is a schematic diagram for simulation of 1 s pathogenic microorganism particle trajectory.
Figure 4:
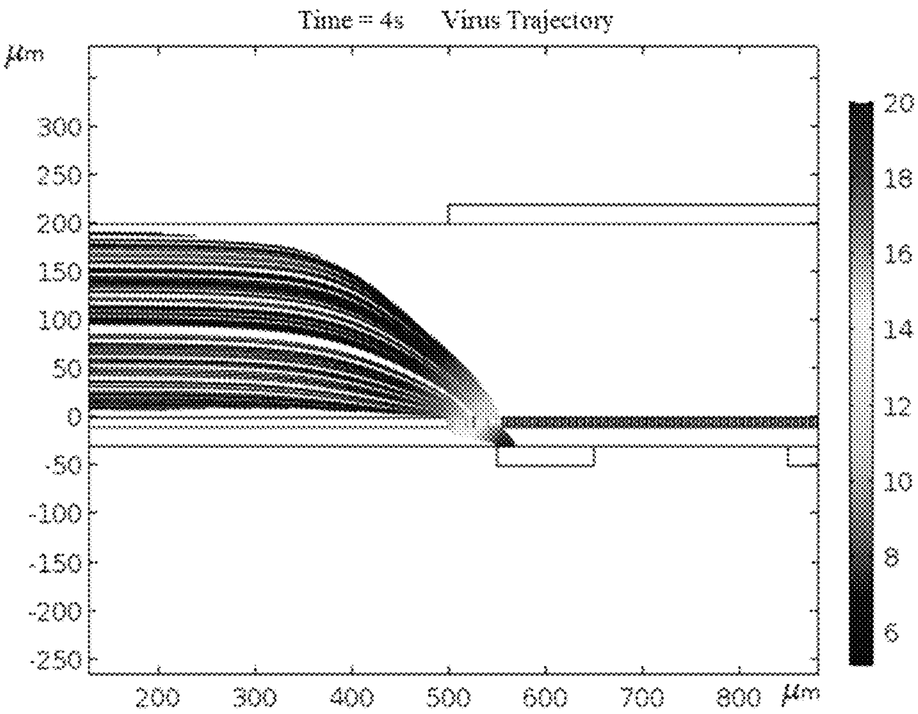
FIG. 4 is a schematic diagram for simulation of 4 s pathogenic microorganism particle trajectory.
Figure 6:
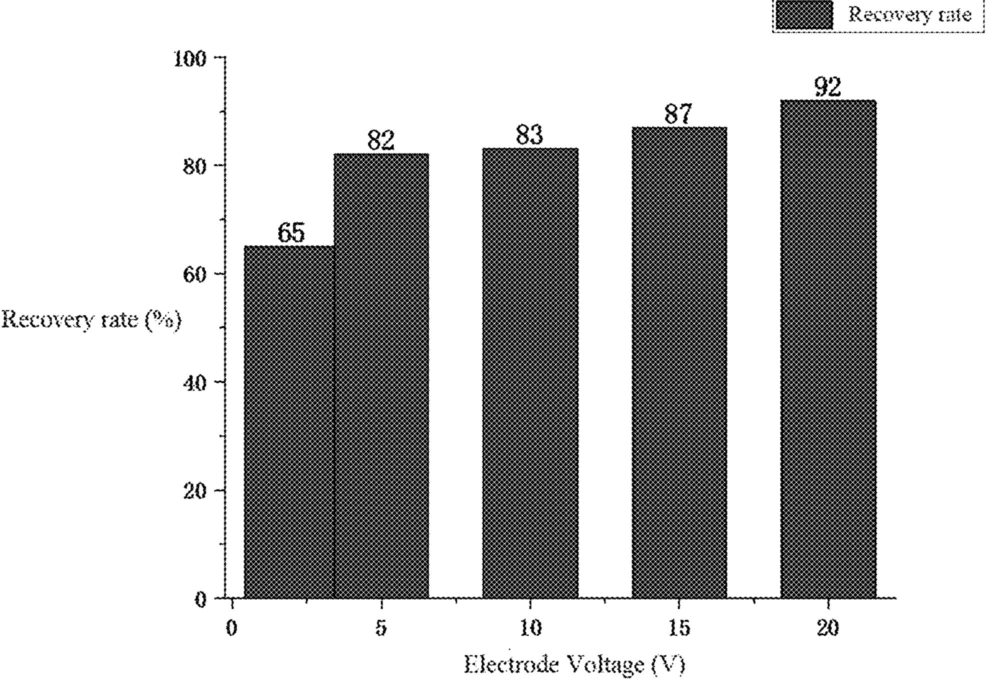
FIG. 6 is a graph showing simulation results of recovery efficiency of pathogenic microorganism particles with 100 nm diameter under different voltage conditions at 5 seconds.
Figure 7:
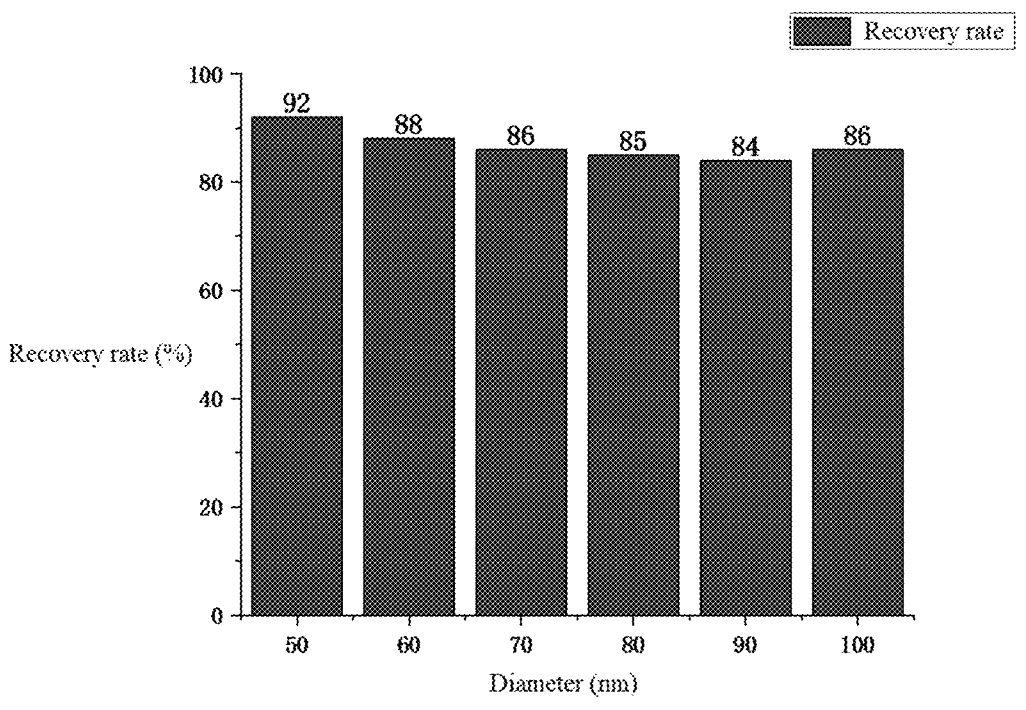
FIG. 7 is a graph showing simulation results of recovery efficiency of pathogenic microorganism particles with different diameters at 20 V for 5 seconds.

This embodiment also provides a pathogenic microorganisms rapid concentration method using the above-described pathogenic microorganisms rapid concentration device. The method comprises:

the sample enters the sample channel 1, the pathogenic microorganism particles are subjected to an electric field force in the direction perpendicular to the flow channel under the action of the positive electrode and the negative electrode, and pass through the filter element 6 to reach the concentration channel 2 in the flow process, and other substances, such as other impurities and particles which cannot pass through, remain in the sample channel 1, namely, the pathogenic microorganisms gradually bias to the positive electrode side, the pathogenic microorganisms 3 enter the concentration channel 2 through the filter element 6, and the waste liquid enters the sample channel 1. The sample with the pathogenic microorganism particles is subjected to both a flow field and an electric field in the device, the flow field or the electric field provide a forward driving force for the pathogenic microorganism particles, and the electric field is capable of deflecting the negatively charged pathogenic microorganism particles with a small voltage. The path of pathogenic microorganism particles entering the channel to be concentrated is shown in FIG. 3, and under the action of an electric field, the pathogenic microorganism particles deviate downwards during the movement, and at 4 S, the deviation path of pathogenic microorganism particles is shown in FIG. 4, and at this time, the pathogenic microorganism particles have passed through the filter element 6 to reach the concentration channel 2 under the action of an electric field. FIG. 6 shows that as the voltage increases, the recovery efficiency of pathogenic microorganism particles to the concentration channel 2 also increases. FIG. 7 shows that the recovery efficiency does not change significantly with the increase of the diameter of pathogenic microorganism particles at 20 v for 5 seconds, and the recovery efficiency is high. Therefore, the device of the present invention can deflect the negatively charged pathogenic microorganism particles with a very small voltage, i.e., less actual consumption and low cost. According to the COMSOL simulation result, the deflection rate can reach 100%, and the theoretical recovery rate of pathogenic microorganisms is very high.

Figure 8:
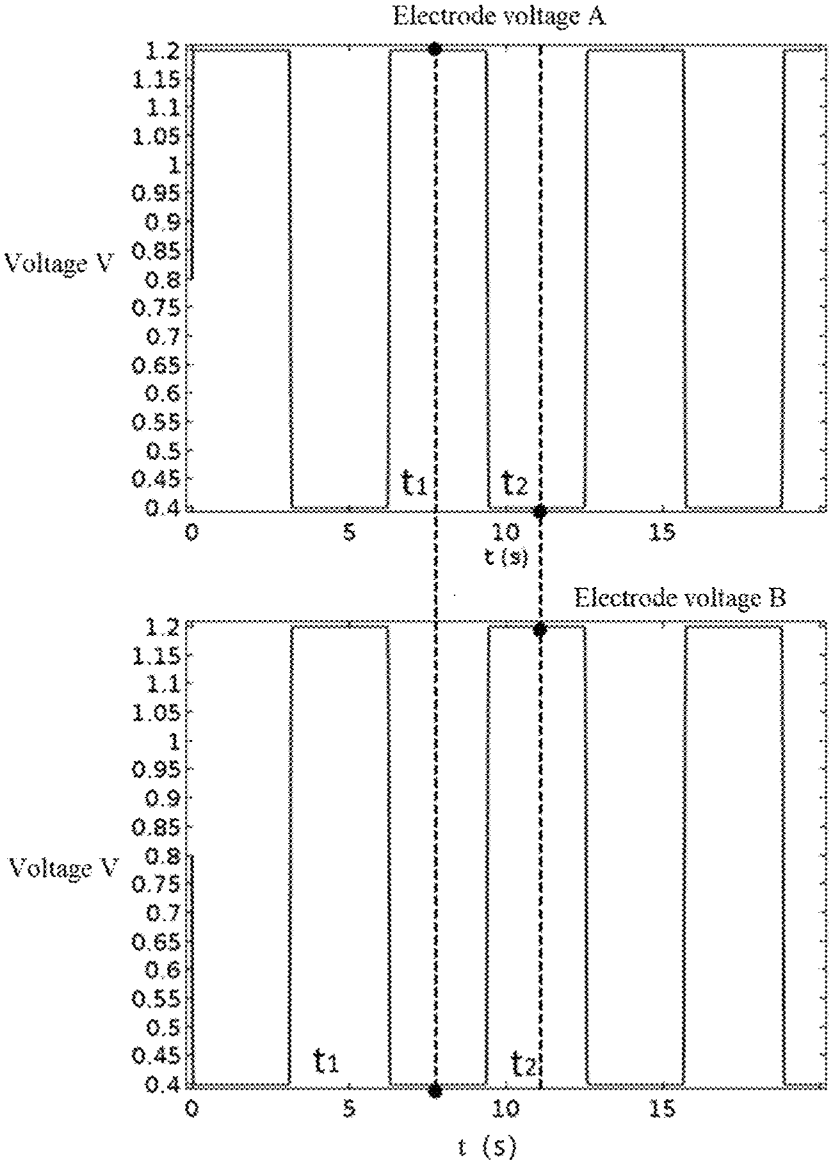
FIG. 8 is a schematic diagram showing voltages applied to a group of adjacent sub-positive electrodes (sub-positive electrode A, sub-positive electrode B) in an embodiment.
Figure 11:
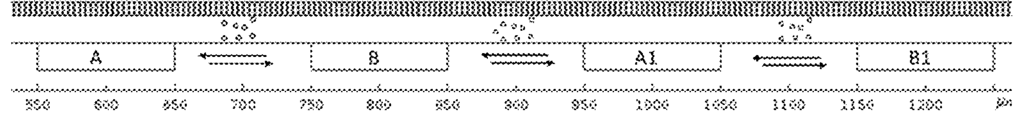
FIG. 11 is a graph showing the enrichment state of pathogen particles between the neutron positive electrode A and the sub-positive electrode B in FIG. 8.

As shown in FIG. 8, a fluctuating voltage greater than zero is applied to a single sub-positive electrode, and the voltage of the sub-positive electrode adjacent thereto alternates with the fluctuating voltage to form a varying potential difference between the adjacent sub-positive electrodes. Note that a plurality of sub-positive electrodes may be provided, and when the plurality of sub-positive electrodes is provided, the positive electrodes include a plurality of groups of adjacent sub-positive electrodes, and only one group (i.e., adjacent sub-positive electrodes A and B) is exemplified in FIG. 8. Here, the electric field distribution at time t1 is shown in FIG. 9, and the electric field distribution at time t2 is shown in FIG. 10. When the voltage on the A and B electrodes is at t1, the voltage of A is 1.2 V, and the voltage of B is 0.4 V, at this time, after the pathogenic microorganism particles are deflected into the flow channel, the pathogenic microorganism particles will move in the direction of strong electric field arrow, as shown in the electric field distribution diagram at t1 (the greater the length of the arrow, the stronger the electric field is represented), the direction of the electric field is from A to B, so the pathogenic microorganism particles will move towards the A electrode. However, when the voltages on the electrodes A and B are at t2, the voltage of A is 0.4 V, and the voltage of B is 1.2 V, at this time, the direction of the electric field of the purification flow channel changes compared with that at t1, the direction of the electric field is directed from B to A, and pathogenic microorganism particles will move to the electrode B. When an alternating square wave voltage is applied to the electrodes A and B, pathogenic microorganism particles will make a reciprocating movement between the two electrodes A and B, and gradually concentrate in the middle area of two alternating sub-positive electrodes, and the zone enrichment state formed under the control of multiple sub-positive electrodes is as shown in FIG. 11; there can be several enrichment regions in which pathogen particles are accumulated formed by this step, and a few or even one enrichment region can be formed by adjusting the operation or not of the electrodes, so that the pathogen in the expiration can be controllably and effectively concentrated, which not only greatly reduces the expiration required to be collected by the gas collection and condensation unit, but also increases the probability that the pathogen in the concentrated sample can be detected, so that the convenience and accuracy of detection can be greatly improved; only a small amount of concentrated sample can be sent to the sample detection unit for detection to facilitate the miniaturization of the system and the continuity of detection;

In this embodiment, the preferable control method of this step is: providing a plurality of individual sub-positive electrodes, wherein a fluctuating electric field is formed among a number of sub-positive electrodes therein, forming one or more enrichment regions, and the number of electrodes supplying voltage during enrichment can also be gradually reduced to form fewer enrichment regions for further enrichment.

The following is illustrated as a preferred scheme (assuming that N single sub-positive electrodes are provided, numbered sequentially 1, 2, 3, 4, . . . , N):

firstly, applying a fluctuating voltage greater than zero on the first, third, fifth, . . . sub-positive electrodes, applying an alternating voltage with an alternating change trend with the fluctuating voltage on the second, fourth, sixth, . . . sub-positive electrodes, until pathogen particles are enriched between the first and second sub-positive electrodes, between the second and third sub-positive electrodes, and between the third and fourth sub-positive electrodes . . . , forming A enrichment regions;

then, controlling the second, fourth, sixth, . . . sub-positive electrodes to be grounded, applying a fluctuating voltage greater than zero on the first, fifth, ninth, . . . sub-positive electrodes, and applying an alternating voltage having an alternating change trend with the fluctuating voltage on the third, seventh, eleventh, . . . sub-positive electrodes, until pathogen particles are enriched between the first and third sub-positive electrodes, between the third and fifth sub-positive electrodes, and between the fifth and seventh sub-positive electrodes . . . , forming B enrichment regions of which the number is less than A;

then, the third, the seventh, the eleventh, . . . sub-positive electrodes are further controlled to be grounded, a fluctuating voltage greater than zero is applied to the first, the ninth, the seventeenth, . . . sub-positive electrodes, and an alternating voltage with an alternating variation trend with the fluctuating voltage is applied to the fifth, the thirteen, the twenty-first, . . . sub-positive electrodes until pathogen particles are enriched between the first and the fifth sub-positive electrodes, between the fifth and the ninth sub-positive electrodes, and between the ninth and the thirteen sub-positive electrodes . . . , forming C enrichment regions of which the number is less than B;

by so doing, the pathogen particle enrichment region is gradually reduced, while the amount of pathogen particles concentrated in each enrichment region is gradually increased. When the desired concentration is reached, all the sub-positive electrodes are then controlled to be grounded, this time, the pathogenic microorganism sample will no longer be controlled by the electric field force, the concentrated sample will continue to flow under the effect of the flow field and/or electric field, and a concentrated sample can be obtained at an outlet of the concentration channel 2.

The above description is of preferred embodiments of the invention and is not intended to limit the invention. It will be understood by a person skilled in the art that various changes in form and details may be made therein without departing from the spirit and scope of the invention.

The invention claimed is:

1. A pathogenic microorganisms rapid concentration device, comprising an electrode and a microchannel for passing a sample, wherein the microchannel comprises a concentration channel and a sample channel, between which a filter element is provided, the electrode comprises a positive electrode and a negative electrode, the positive electrode comprises a plurality of sub-positive electrodes provided in a spaced array on a side close to the concentration channel, the negative electrode is provided on a side close to the sample channel, wherein when a fluctuating voltage greater than zero is applied to one of the plurality of sub-positive electrodes, the voltage of another of the plurality of sub-positive electrodes adjacent to the one of the plurality of sub-positive electrodes alternates with the fluctuating voltage to form a varying potential difference between the one and the another of the plurality of sub-positive electrodes to regionally enrich pathogenic microorganisms in the sample flowing into the microchannel on a positive electrode side of the concentration channel to form one or more enrichment regions with the pathogenic microorganisms in the concentration channel.

2. The pathogenic microorganisms rapid concentration device according to claim 1, wherein a pair of driving electrodes are provided at an outlet and an inlet of the microchannel.

3. The pathogenic microorganisms rapid concentration device according to claim 1, wherein the fluctuation form of fluctuation voltage greater than zero comprises rectangular wave, and/or triangular wave, and/or sine wave, or the superposition wave of the first three waves.

4. The pathogenic microorganisms rapid concentration device according to claim 1, wherein the filter element is a semi-permeable membrane, and/or an array of micro-columns, and/or a gel polymer, and is a filter structure with voids.

5. The pathogenic microorganisms rapid concentration device according to claim 1, wherein the concentration channel has a width smaller than that of the sample channel.

6. The automatic pathogen-from-expiration detection system according to claim 5, wherein the width L1 of the sample channel and the width L2 of the concentration channel satisfy:

$$L1V1/L2V2 \geq X$$

wherein V1 is a flow rate of the sample channel, V2 is a flow rate of the concentration channel, and X is a ratio of the concentration of the concentrated sample to the concentration of the sample before concentration.

7. The pathogenic microorganisms rapid concentration device according to claim 1, wherein the microchannel is made of polymethyl methacrylate (PMMA), polyethylene (Tygon), poly (ethylene-co-propylene) (FEP) or poly (tetrafluoroethylene) (PTFE), COC/COP cyclic olefin copolymer, polycarbonate (PC).

8. A pathogenic microorganisms rapid concentration method based on the pathogenic microorganisms rapid concentration device according to claim 1, comprising:

making the sample enter the microchannel, under the action of the positive electrode and the negative electrode, gradually biasing the pathogenic microorganisms to one side of the positive electrode, and making the pathogenic microorganisms enter the concentration channel via the filter element;

applying a fluctuating voltage greater than zero on a single sub-positive electrode, wherein the voltage of the sub-positive electrode adjacent thereto alternates with the fluctuating voltage and forms a varying potential difference between the adjacent sub-positive electrodes, and pathogenic microorganisms reciprocate between the two adjacent sub-positive electrodes and gradually enrich in the middle region of the two adjacent sub-positive electrodes; and obtaining a concentrated sample at the outlet of the concentration channel.

9. The automatic pathogen-from-expiration detection method according to claim 8, wherein several sub-positive electrodes are provided, wherein some or all the single sub-positive electrodes are applied with a fluctuating voltage, and a fluctuating electric field is formed among a number of sub-positive electrodes therein, forming one or more enrichment regions, and the number of electrodes supplying voltage during enrichment can also be gradually reduced to form fewer enrichment regions for further enrichment.

* * * * *